United States Patent [19]

Hashimoto et al.

[11] Patent Number: 4,823,933
[45] Date of Patent: Apr. 25, 1989

[54] BALLET SHIFTER

[75] Inventors: Naoyuki Hashimoto, Moriguchi; Kazuichi Yamashita, Kyoto; Manabu Yamane, Neyagawa, all of Japan

[73] Assignee: Matsushita Electric Industrial Co., Ltd., Kadoma, Japan

[21] Appl. No.: 884,502

[22] Filed: Jul. 11, 1986

[30] Foreign Application Priority Data

Jul. 12, 1985 [JP] Japan .................................. 60-154589

[51] Int. Cl.$^4$ .............................................. B65G 37/00
[52] U.S. Cl. ............................ 198/465.3; 198/468.6
[58] Field of Search ............. 198/346.1, 346.2, 463.3, 198/465.3, 468.6, 797, 465.1, 475.1; 414/110

[56] References Cited

U.S. PATENT DOCUMENTS

| 1,849,385 | 3/1932 | Sekutski | 198/463.3 |
| 2,613,798 | 10/1952 | McPhee | 198/463.3 X |
| 2,818,156 | 12/1957 | Edwards | 198/463.3 |
| 3,313,393 | 4/1967 | Solski et al. | 198/465.1 |
| 3,587,823 | 6/1971 | Hartz | 198/468.6 |
| 3,779,361 | 12/1973 | Schmitt | 198/465.3 X |
| 3,841,460 | 10/1974 | Suter | 198/463.3 |
| 4,632,633 | 12/1986 | Avey | 414/110 X |

FOREIGN PATENT DOCUMENTS

| 451585 | 12/1974 | U.S.S.R. | 198/463.3 |
| 2086340 | 2/1982 | United Kingdom | 198/463.3 |

Primary Examiner—Randolph A. Reese
Assistant Examiner—John A. Ricci
Attorney, Agent, or Firm—Cushman, Darby & Cushman

[57] ABSTRACT

A pallet shifter having two pallet carriers (4a, 4b) rotated by a hydraulic cylinder (5) or the like, the pallet carriers (4a, 4b) being kept in horizontality by a parallelogram link (50, 60) defined by a center (7) of rotation of the driving lever (8), a center (11) of rotation of a pallet carriers (4a, 4b), a center (12) of rotation of a stabilizing lever (13), and a coupling point (14) of the stabilizing lever (13) and the pallet carriers (4a, 4b).

2 Claims, 3 Drawing Sheets

BALLET SHIFTER

FIELD OF THE INVENTION AND RELATED ART STATEMENT

1. Field of the Invention

The present invention relates to a pallet shifter for transferring pallets between running conveyors which convey the pallets in opposite directions from each other and have a difference of positional level from each other.

2. Description of the Related Art

FIG. 1 shows a pallet shifter of the prior art. In FIG. 1, reference numeral 71 denotes a pallet carrier slidable on guide rail by known sliding means. Reference numeral 72 denotes guide rails for the pallet carrier, and reference numeral 73 denots a pallet.

First, the pallet carrier 71 receives the pallet 73 as shown by an arrow A from an upper conveyor (not shown) and then brings it down along the guide rails 72 as shown by an arrow B (first and second steps). Then, the pallet carrier 1 transfers the pallet 73 to a lower conveyor (not shown) as shown by an arrow C (third step). And finally, the pallet carrier 71 is brought up along the guide rails 72 as shown by an arrow D (fourth step).

In the prior art pallet shifter, four steps are necessary in one cycle of pallet transfer. Therefore, the time necessary for pallet transfer is quite long, and the output interval of a manufacturing process also becomes long.

OBJECT AND SUMMARY OF THE INVENTION

It is an object of this invention to provide an improved pallet shifter, and more particularly to a pallet shifter having an excellent ability to transfer pallets for, attaining high productivity.

A pallet shifter in accordance with the present invention comprises:

driving lever means rotatable about a central axis by a driving shaft which is driven by driving means, pallet carriers pivotally carried an the opposite ends of means, and a pallet carrier stabilizing lever which forms a first parallelogram link together with a part of the driving lever means by connecting the center of rotation of the driving lever means and a center of rotation of the stabilizing lever, to a first fixed point and a second fixed point, respectively, and by connecting a center of rotation of the pallet carrier, and another point of the pallet carrier, to one end of the driving lever means and one end of the stabilizing lever, respectively.

DETAILED DESCRIPTION OF A PREFERRED EMBODIMENTS

The constitution of a preferred embodiment of a pallet shifter embodying the present invention is described in detail with reference to FIGS. 2, 3 and 4.

Figure 1:
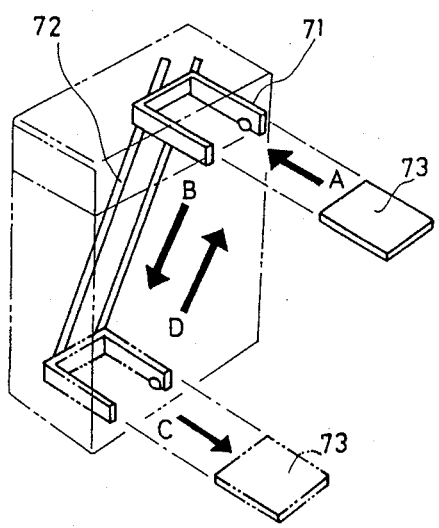
FIG. 1 is a perspective illustration showing a pallet shifter of the prior art.
Figure 2:
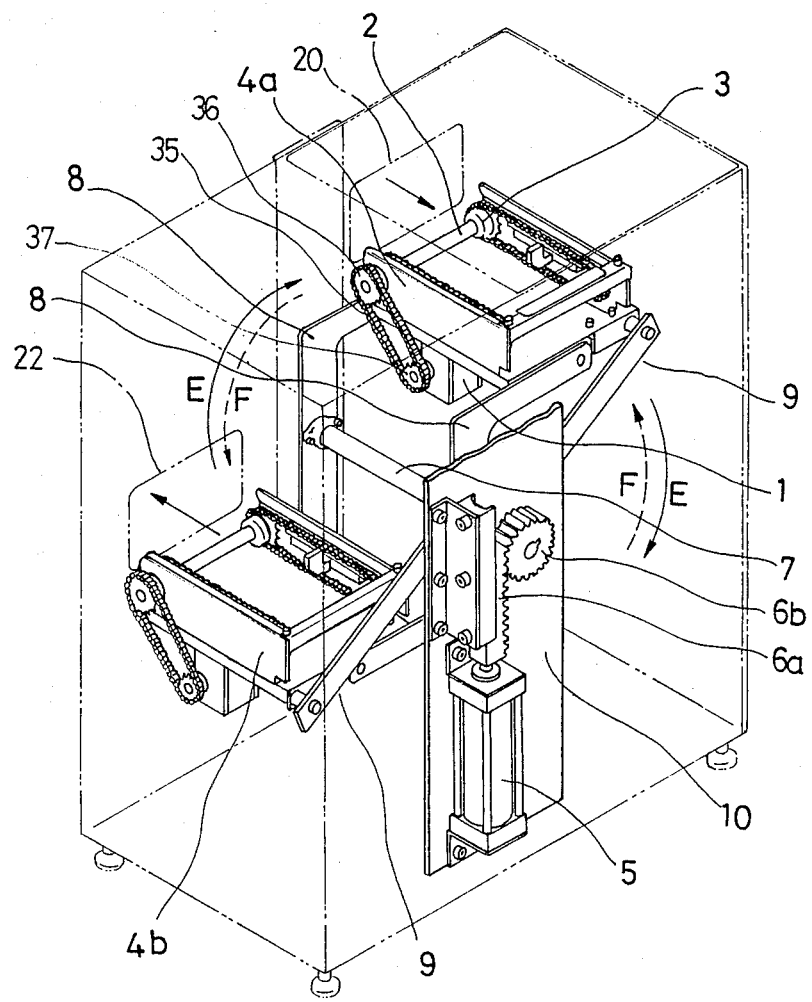
FIG. 2 is a perspective illustration showing a pallet shifter embodying the present invention.

Referring first to FIG. 2, there are shown two pallet carriers 4a and 4b. The pallet carrier 4a is in position to receive a pallet (not shown) from a conveyor (not shown) moving in the direction of the arrow through an opening 20. The pallet carrier 4b is in position to discharge a pallet (not shown) through an opening 22 onto a conveyor (not shown) moving in the direction of the arrow. Each pallet carrier 4a and 4b is equipped with a reversible motor 1 which drives a sprocket 37 over which is trained a chain 35 to drive a sprocket 36 on the end of a shaft 2 which drives an endless chain 3 for moving a pallet (not shown) into or out of the pallet carrier. The shaft 2 is rotated in a selected direction by the motor 1 to move a pallet into or out of the pallet carrier. The pallet carriers 4a and 4b are pivotally carried on the opposite ends of spaced driving lever 8, the midpoints of which are fixed to a shaft 7 journalled in a fixed frame 10 and rotated in a selected direction by an appropriate motor, such as an air cylinder 5 carrying a rack 6a engaged with a pinion 6b on the end of the shaft 7.

Rotation of the shaft 7 by the motor 5 transfers the pallet carriers 4a and 4b between the two conveyor openings 20 and 22, i.e. carrier 4a from opening 20 to opening 22 and carrier 4b from opening 22 to opening 20, as shown by the arrow E. Thus, as carrier 4b receives a pallet through the opening 20 the carrier 4a discharges a pallet, previously received through the opening 20, through the opening 22. Reverse rotation of the shaft 7 then brings the carriers back to the positions shown in FIG. 2 to repeat the receiving and discharging steps.

Figure 3:
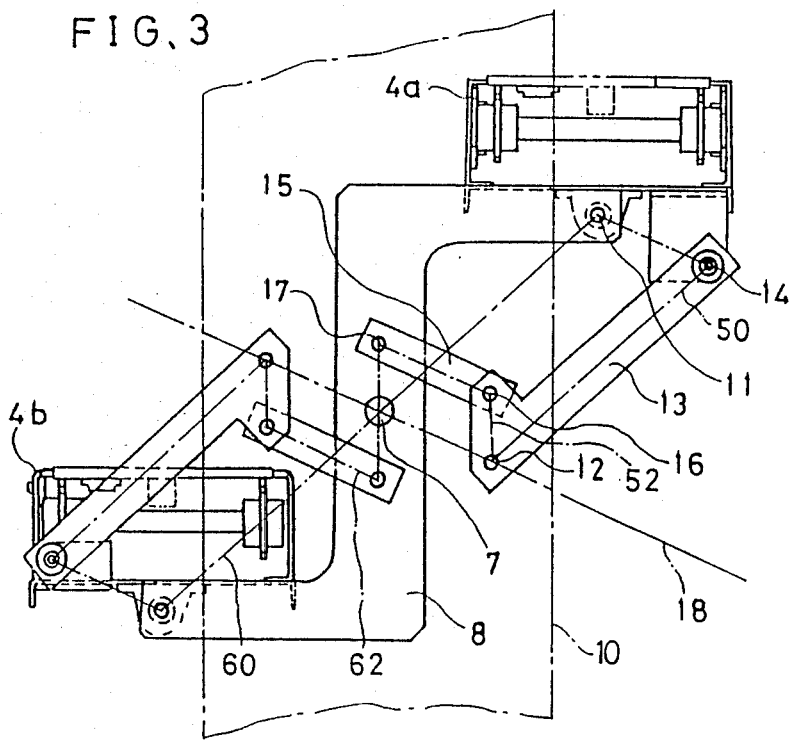
FIG. 3 is a side view showing one state of the pallet shifter of FIG. 2.
Figure 4:
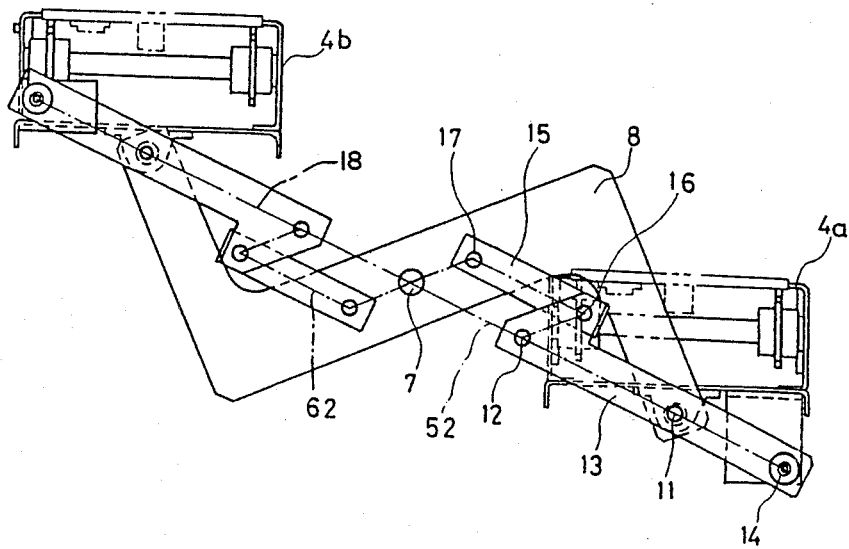
FIG. 4 is a side view showing another state of the pallet shifter of FIG. 2.

The pallet carriers are maintained in a horizontal stable position during their movements between the two openings 20 and 22 by separate parallelogram linkage arrangements 9 shown best in FIGS. 3 and 4. Each pallet carrier is pivotally carried on its respective end of the driving lever 8 by a pivot pin 11 located centrally of the carrier. Each parallel linkage arrangement 9 includes two stabilizing levers, 13 and 15 for the carrier 4a. One end of the lever 13 is pivotally connected by pivot pin 14 to the carrier 4a at a location remote from the pivot pin 11 and the other end of the lever 13 is pivotally connected to the fixed frame 10 by a pin 12. The distance between the pins 12 and 14 is made the same as the distance between the pin 11 and the shaft 7, while the distance between the pins 11 and 14 is made the same as the distance between the pin 12 and the shaft 7. Thus, a first parallelogram linkage 50 is made by the shaft 7 and the pins 11, 14 and 12. This linkage 50 maintains the pallet carrier 4a in a horizontal position when the driving levers 8 are rotated. Another parallelogram linkage 52 is formed by connecting one end of the second stabilizing lever 15 to the lever 13 by a pivot pin 16 and the other end to the lever 8 by a pivot pin 17. Again, the distance between the pins 16 and 17 is the same as that between the shaft 7 and the pin 12. Further the distance between the shaft 7 and the pin 17 is the same as the distance between the pins 12 and 16. The parallelogram linkage arrangements 9 for the pallet carrier 4b are the same as those for the pallet carrier 4a and involve a first parallelogram linkage 60 and a second parallelogram linkage 62.

When the pallet carriers are moved to the positions shown in FIG. 4, by rotation of the shaft 7, the first parallelogram linkages 50 and 60 become unstable because all of the pivot pins of each are arranged in a straight line 18. However, the second parallelogram linkages 52 and 62 are then not unstable because the pins thereof are not in a straight line. Thus the pallet carriers still maintain their horizontal positions during all their transferring movements.

Although oscillation or reversible rotation of the driving shaft, has been shown as being effected by the cylinder 5 and by the rack 6a and pinion 6b, it will be realized that such oscillation can be effected by other driving means, such as a reversible electric motor. Still further, it will be realized that means other than the arrangement shown may be used for transferring a pallet to or from a conveyor from or to a pallet carrier.

It is pointed out that the pallet shifter in accordance with this invention transfers pallets in only two steps in any one cycle while the prior art shifter, described above, requires four steps in any one cycle.

What is claimed is:

1. A pallet shifter for transferring pallets from one conveyor having a discharge end to another conveyor having a receiving end, comprising:

driving lever means, having a midpoint and opposite ends, carried for reversible rotation about said midpoint on a horizontal shaft journalled in a fixed frame and driven by reversible driving means;

pallet carriers pivotally carried about horizontal axes on said opposite ends of said driving lever means for movement thereby between the discharge and receiving ends, respectively, of two pallet carrying conveyors moving in opposite directions so that when one pallet carrier is at the discharge end of one conveyor to receive a pallet therefrom, the other pallet carrier is at the receiving end of the other conveyor to discharge thereto a pallet previously received from the one conveyor; and stabilizing lever arrangements for maintaining said pallet carriers substantially horizontal during their movements between the conveyor ends, each of said arrangements including a first stabilizer lever having one end thereof pivotally connected to said fixed frame and the other end thereof to the respective carrier so that the axis of said shaft, the axis of the pivotal connection of the respective carrier to an end of said driving lever means and the axes of the two pivotal connections of said first stabilizing lever and the structural parts of said frame, said driving lever means, said respective carrier and said first stabilizing lever extending between said axes define a parallelogram linkage and a second stabilizing lever having one end thereof pivotally connected to said driving lever means and the other end thereof to said first stabilizing lever so that the axis of said shaft, the axes of the two pivotal connections of said second stabilizing lever and the axis of the pivotal connection of said first stabilizing lever to said frame and the structural parts of said frame, said driving lever means, said second stabilizing lever and said first stabilizing lever extending between said axes define a second parallelogram linkage arranged to be stable when said first parallelogram linkage becomes unstable when all the pivot axes thereof are arranged in a straight line.

2. A pallet shifter in accordance with claim 1, wherein the reversible driving means comprises a rack to be moved by a cylinder and a pinion engaging with the rack.

* * * * *

UNITED STATES PATENT AND TRADEMARK OFFICE
CERTIFICATE OF CORRECTION

PATENT NO. : 4,823,933
DATED : Apr. 25, 1989
INVENTOR(S) : HASHIMOTO et al

It is certified that error appears in the above-identified patent and that said Letters Patent is hereby corrected as shown below:

IN THE TITLE - [54] BALLET SHIFTER:

Change "BALLET" to -- PALLET --.

Signed and Sealed this

Fifth Day of December, 1989

*Attest:*

JEFFREY M. SAMUELS

*Attesting Officer*      *Acting Commissioner of Patents and Trademarks*